United States Patent
Yamada et al.

(10) Patent No.: US 6,532,269 B2
(45) Date of Patent: Mar. 11, 2003

(54) DATA TRANSMITTER, DATA RECEIVER, PROCESSOR, EQUIPMENT MANAGING DEVICE, EQUIPMENT MANAGING SYSTEM, DATA TRANSMITTING-RECEIVING SYSTEM, AND MEDIUM

(75) Inventors: Masazumi Yamada, Moriguchi (JP); Akira Iketani, Higashiosaka (JP); Akira Usui, Takatsuki (JP); Masaaki Kobayashi, Kawanishi (JP); Hidetoshi Takeda, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/230,995

(22) PCT Filed: Jul. 31, 1997

(86) PCT No.: PCT/JP97/02672

§ 371 (c)(1),
(2), (4) Date: Feb. 5, 1999

(87) PCT Pub. No.: WO98/06221

PCT Pub. Date: Feb. 12, 1998

(65) Prior Publication Data

US 2002/0051082 A1 May 2, 2002

(30) Foreign Application Priority Data

Aug. 5, 1996 (JP) .............................................. 8-205633
Nov. 18, 1996 (JP) .............................................. 8-306518

(51) Int. Cl.$^7$ .......................... H04N 3/27; H04N 7/173; H04L 5/12; H04L 7/02

(52) U.S. Cl. ........................ 375/265; 375/358; 725/115; 725/116; 725/139; 725/143; 348/554; 348/467; 348/484

(58) Field of Search ................................. 348/461, 460, 348/462, 465, 467, 473, 484, 571, 12, 14.2, 13, 14.3, 14, 563, 17, 567, 554, 553; 375/259, 264–265, 358, 286; 709/217; 725/114, 105, 116, 118, 131, 143, 138, 139, 144, 145, 146, 148, 151

(56) References Cited

U.S. PATENT DOCUMENTS

| 5,121,113 A | 6/1992 | Kedge et al. |
| 5,440,632 A | 8/1995 | Bacon et al. ............... 380/20 |

(List continued on next page.)

FOREIGN PATENT DOCUMENTS

| EP | 637157 | 2/1995 |
| EP | 0 762 777 | 3/1997 |
| JP | 62-257289 | 11/1987 |

(List continued on next page.)

OTHER PUBLICATIONS

European search report for Int'l Appn No. EP 97 93 3868 dated Jun. 9, 1999.

(List continued on next page.)

Primary Examiner—Matthew C. Bella
Assistant Examiner—Wesner Sajous
(74) Attorney, Agent, or Firm—RatnerPrestia (57) ABSTRACT

When transmitting encoded video data and audio data, a transmitter 201 also transmits a decoding method 107 generated by decoding-method generation means 203. In the case of a receiver 202, decoding control means 111 controls decoding means 208 in accordance with a received decoding method 113 and thereby, decodes video data and audio data 115. Thus, it is unnecessary for the receiver 202 to previously prepare all of a plurality of decoding methods and the transmitter 201 does not need to encode video data or audio data in accordance with the decoding method owned by the receiver 202.

21 Claims, 6 Drawing Sheets

U.S. PATENT DOCUMENTS

| | | | | |
|---|---|---|---|---|
| 5,495,285 A | * | 2/1996 | Fujioka | 348/18 |
| 5,717,706 A | * | 2/1998 | Ikeda | 375/265 |
| 5,729,526 A | * | 3/1998 | Yoshida | 370/206 |
| 5,754,849 A | * | 5/1998 | Dyer et al. | 345/612 |
| 5,838,728 A | * | 11/1998 | Alamouti | 375/265 |
| 5,903,617 A | * | 5/1999 | Kamalski | 375/354 |
| 5,928,377 A | * | 7/1999 | Doran | 375/265 |
| 5,931,965 A | * | 8/1999 | Alamouti | 375/265 |
| 5,987,509 A | * | 11/1999 | Portuesi | 709/217 |
| 6,088,717 A | * | 7/2000 | Reed | 709/201 |
| 6,125,146 A | * | 9/2000 | Frencken | 348/420.1 |
| 6,081,296 A | * | 11/2000 | Fukunaga | 348/415 |
| 6,148,032 A | * | 11/2000 | Pearlstein | 348/409.1 |

FOREIGN PATENT DOCUMENTS

| | | |
|---|---|---|
| JP | 63-245766 | 10/1988 |
| JP | 2-113790 | 4/1990 |
| JP | 2-124644 | 5/1990 |
| JP | 3-244278 | 10/1991 |
| JP | 4-8064 | 1/1992 |
| JP | 04008064 | 1/1992 |
| JP | 4-207380 | 7/1992 |
| JP | 5-207475 | 8/1993 |
| JP | 5-216971 | 8/1993 |
| JP | 5-316369 | 11/1993 |
| JP | 7-44474 | 2/1995 |
| JP | 7-75091 | 3/1995 |
| JP | 7-87468 | 3/1995 |
| JP | 7-287675 | 10/1995 |
| JP | 08018793 | 1/1996 |
| JP | 8-79296 | 3/1996 |
| JP | 8-256063 | 10/1996 |
| JP | 9-74556 | 3/1997 |
| JP | 9-107544 | 4/1997 |
| JP | 9-120666 | 5/1997 |

OTHER PUBLICATIONS

Japanese language search report for Int'l Appln No. PCT/JP98/02672 dated Nov. 26, 1998.

English translation of Japanese language search report.

"The Journal of the Institute of Image Electronics Engineers of Japan", vol. 26, No. 3, 1996.

T. Miki, "MPEG4 Standardisation Activities", NTT Mobile Communications Network Inc., Technical Report of IEICE, pp. 43–48.

* cited by examiner

Brightness(Y)

Color difference (CR)

Color difference (CB)

DATA TRANSMITTER, DATA RECEIVER, PROCESSOR, EQUIPMENT MANAGING DEVICE, EQUIPMENT MANAGING SYSTEM, DATA TRANSMITTING-RECEIVING SYSTEM, AND MEDIUM

This Application is a U.S. National Phase Application of PCT International Application PCT/JP97/02672.

TECHNICAL FIELD

The present invention relates to a data transmitter, a data receiver, a processor, a unit controller, a unit control system, a data transmission/reception system, and a medium for, for example, transmitting or receiving data and controlling operations of units.

BACKGROUND ART

It is generally known that digital video data and digital audio data are the data having a large redundancy. Therefore, digital video data and digital audio data are encoded to reduce the redundancy of them and then, recorded or transmitted. Digital video data and digital audio data are encoded at the transmission side and then transmitted, and decoded at the reception side.

Thus, by encoding digital video and digital audio data and then transmitting them, it is possible to effectively use the capacity and bandwidth of a transmission medium.

An MPEG (Moving Picture Experts Group) is one of the methods for encoding digital video data and digital audio data. The MPEG includes MPEG1 such as a CD-ROM for recording data in an accumulation medium at a low rate and MPEG2 for realizing a high picture quality capable of withstanding broadcasting and corresponding to different screen sizes.

A DV is also practically used which uses an encoding method different from the MPEG as a household digital VCR.

Thus, to record video data and audio data according to different encoding methods in a recorder and transmit them through the same transmission medium, the identification information for identifying encoding methods is recorded and transmitted together with encoded video data and audio data. This identification information makes it possible to select a proper decoding method out of a plurality of decoding methods when reproducing or receiving data.

For example, in the IEEE 1394 currently developed as a digital interface for transferring digital video data and audio data, it is decided to add identification information showing the type of data to the head of the data based on the MPEG method or DV method when transmitting the data.

Thereby, it is possible to mix digital video data and audio data generated through a plurality of different encoding methods on one communication medium and the reception side can properly decode received video data and audio data by confirming the identification information.

However, to correspond to a plurality of types of encoding methods, circuits or software for executing the respective processings must be previously prepared.

Therefore, there is a problem that, to correspond to many encoding methods, decoding circuits or programs equal to the number of encoding methods must be prepared.

Moreover, there is a problem that it is impossible to correspond to a new encoding method that is not previously prepared.

The MPEG and DV use picture encoding (compression) methods different from each other. Therefore, there is no compatibility between the data encoded by the MPEG and the data encoded by the DV.

However, the arts used for encoding include many common portions. For example, the above both methods use DCT (Discrete Cosine Transform) and variable-length encoding.

Thus, a plurality of picture encoding methods are present and most encoding methods include many common processings though the processings are not completely the same.

A unit controller for controlling these data reception/transmission and operations may display transmitter and receiver or substance of data on GUI of the unit controller through icons. Also in this case, it is possible to distinguish between types of units or types of data and thereby display an icon by using the identification information for types of units or types of data.

However, to correspond to a plurality of types of units or types of data, there are problems that each icon must be previously prepared and moreover, each icon must correspond to each type of unit or each type of data.

Moreover, there is a problem that it is impossible to correspond to a new type of unit or data that is not previously prepared.

Furthermore, when displaying the substance of data with an icon, in order to use icons related to the contents of data, it is necessary to once read data, a unit controller must generate an icon, and it is necessary to separately store the icon.

DISCLOSURE OF THE INVENTION

To solve the above conventional problems, the present invention provides a data transmitter, a data receiver, and a medium capable of corresponding to a plurality of encoding methods and moreover, new encoding methods by transmitting a decoding method together with encoded video data and audio data.

Moreover, to solve the above conventional problems, the present invention provides a data transmitter, a processor, a unit controller, a unit control system, data transmission/reception system, and a medium making it possible to display a plurality of types of units and types of data and moreover, icons related to the contents of data by providing the image data used to visually display units or data like icons for each unit connected by a communication medium instead of providing the data for each unit for displaying a screen.

One aspect of the of the present invention (corresponding to claim 1) is a data transmitter comprising:

transmission means for transmitting at least either of encoded video data and encoded audio data to a data receiver;

a processing-command list for holding a processing procedure common to said data receiver; and decoding-method generation means for expressing a method for decoding at least either of said encoded video data and encoded audio data by the sequence of said processing procedure and processing parameters included in said processing-command list and outputting the method as a decoding method, wherein said transmission means transmits at least either of said encoded video data and encoded audio data and moreover, transmits said decoding method.

According to the above structure, for example, the data transmitter can transmit encoded video data and encoded audio data together with a method for decoding these types of data. Therefore, a data receiver can properly decode received video data and audio data.

Another aspect of the present invention (corresponding to claim 5) is a data transmitter comprising:

transmission means for transmitting at least either of encoded video data and encoded audio data to a data receiver;

request reception means for receiving an inquiry about the method for decoding at least either of said encoded video data and encoded audio data, making a predetermined decision, and thereafter outputting a decoding-method transmission command in accordance with the decision result;

a processing-command list for holding a processing procedure common to said data receiver; and decoding-method generation means for expressing a method for decoding at least either of said encoded video data and encoded audio data by the sequence of said processing procedure and processing parameters included in said processing-command list when obtaining the output of said decoding-method transmission command and outputting the method as a decoding method; wherein said transmission means transmits at least either of said encoded video data and encoded audio data and moreover, transmits said decoding method.

According to the above structure, for example, the data transmitter can transmit encoded video data and encoded audio data together with a method for decoding these data. Particularly, because the decoding method is transmitted in accordance with the request from a receiver, the data transmitter can make a predetermined decision on the transmission of the decoding method and moreover, it is possible to realize the usage of changing encoding methods for concealment or accounting. Moreover, as described above, a data receiver can properly decode received video data and audio data.

Still another aspect of the present invention (corresponding to claim 7) is a data receiver comprising:

reception means for receiving at least either of encoded video data and encoded audio data and a decoding method from a data transmitter;

a processing-procedure list for holding a processing procedure common to said data transmitter and a method for realizing said processing procedure;

decoding control means for obtaining said received decoding method, reading a method for realizing a processing procedure included in the decoding method from said processing-procedure list and outputs the method as a decoding control signal; and decoding means for decoding at least either of said received video data and audio data in accordance with the designation by said decoding control signal.

According to the above structure, for example, the data receiver can use a decoding method received together with encoded video data and audio data when receiving and decoding the video data and audio data. Thereby, it is easy to correspond to a plurality of encoding methods, particularly to a new encoding method.

Yet another aspect of the present invention (corresponding to claim 9) is a data receiver comprising:

reception means for receiving at least either of encoded video data and encoded audio data and a decoding method from a data transmitter;

a processing-procedure list for holding a processing procedure common to said data transmitter and said processing-procedure realizing method;

decoding control means for obtaining said received decoding method, reading a processing-procedure realizing method included in the decoding method from said processing-procedure list, and outputting the method as a decoding control signal;

decoding means for decoding at least either of said received video data and audio data in accordance with the designation by said decoding control signal, decides whether the decoding is normal, and outputting a decoding-method transmission request for requesting the decoding method when obtaining a decision result that said decoding is not normal; and request transmission means for transmitting an inquiry about said decoding method when receiving said decoding-method transmission request.

According to the above structure, for example, the data receiver can use a decoding method received together with encoded video data and audio data when receiving and decoding-the encoded video data and audio data. Thereby, it is easy to correspond to a plurality of encoding methods, particularly to a new encoding method. Moreover, the data transmitter can make a predetermined decision on the transmission of a decoding method, and it is also possible to use the decoding method for concealment or accounting.

Still yet another aspect of the present invention (corresponding to claim 15) is a processor comprising:

a storage medium for holding the image data for visually showing at least either of the function of a processor and a state of said processor;

first request-acceptance means for accepting a transmission request for requesting the transmission of said image data; and image-data transmission means for reading said image data from said storage medium and transmitting the image data when said first request-acceptance means receives said transmission request.

According to the above structure, for example, the processor can transmit image data to an apparatus for visually displaying the function and state of the processor. Thereby, a unit controller for controlling the processor and the like does not need to previously prepare the image data corresponding to the type of each unit and it can easily correspond to a new type of unit. Moreover, because the processor changes image data by corresponding to change of states, the unit controller can visually display a state of the processor without using detailed data for the processor.

A further aspect of the present invention (corresponding to claim 18) is an unit controller comprising:

request transmission means for transmitting a transmission request for the image data for visually showing at least either of a function of a processor capable of transmitting said image data and a state of said processor to the processor;

image-data reception means for receiving said image data; and display means for displaying the image data received by said image-data reception means.

According to the above structure, for example, the unit controller does not need to previously prepare the image data corresponding to the type of unit and it can easily display the screen of a new type of unit. Moreover, it is possible to visually display a state of a unit without using the information for the unit by regularly updating the image data.

A still further aspect of the present invention (corresponding to claim 21) is a data transmitter comprising:

a storage medium for holding the image data for visually showing the content of at least either of video data and audio data;

first request-acceptance means for accepting a transmission request for requesting the transmission of said image data; and image-data transmission means for reading said image data from said storage medium and transmitting the image data when said first request-acceptance means receives said transmission request.

According to the above structure, for example, because the data transmitter has image data, a unit controller for displaying the image data can display the image data independently of the format of the data. Moreover, it is possible to use image data related to the content of data and therefore, it is unnecessary that the unit controller once reads data and generates image data.

A yet further aspect of the present invention (corresponding to claim 25) is an unit controller comprising:

request transmission means for transmitting a transmission request for the image data for visually showing the content of at least either of video data and audio data to a data transmitter capable of transmitting said image data;

image-data reception means for receiving said image data; and display means for displaying said image data received by said image-data reception means.

According to the above structure, for example, the unit controller can display image data independently of the type of data. Moreover, it is possible to use the image data related to the content of data without reading the data.

(DESCRIPTION OF SYMBOLS)

101, 201 Transmitter
102, 202 Receiver
103 Transmission means
104, 203 Decoding-method generation means
105 Processing-command list
106 Encoded video data and audio data
107 Decoding method
108 Transmission medium
109 Reception means
110 Decoding means
111 Decoding control means
112 Processing-procedure list
113 Decoding method
114 Decoding control signal
115 Encoded video data and video data
116 Decoded audio data and audio data
204 Request reception means
205 Decoding-method transmission command
206 Request transmission means
207 Decoding-method transmission request
208 Decoding means
507 FMT (Format)

BEST MODE FOR CARRYING OUT THE INVENTION

Embodiments of the present invention are described below by referring to the accompanying drawings.

(Embodiment 1)

Figure 1:
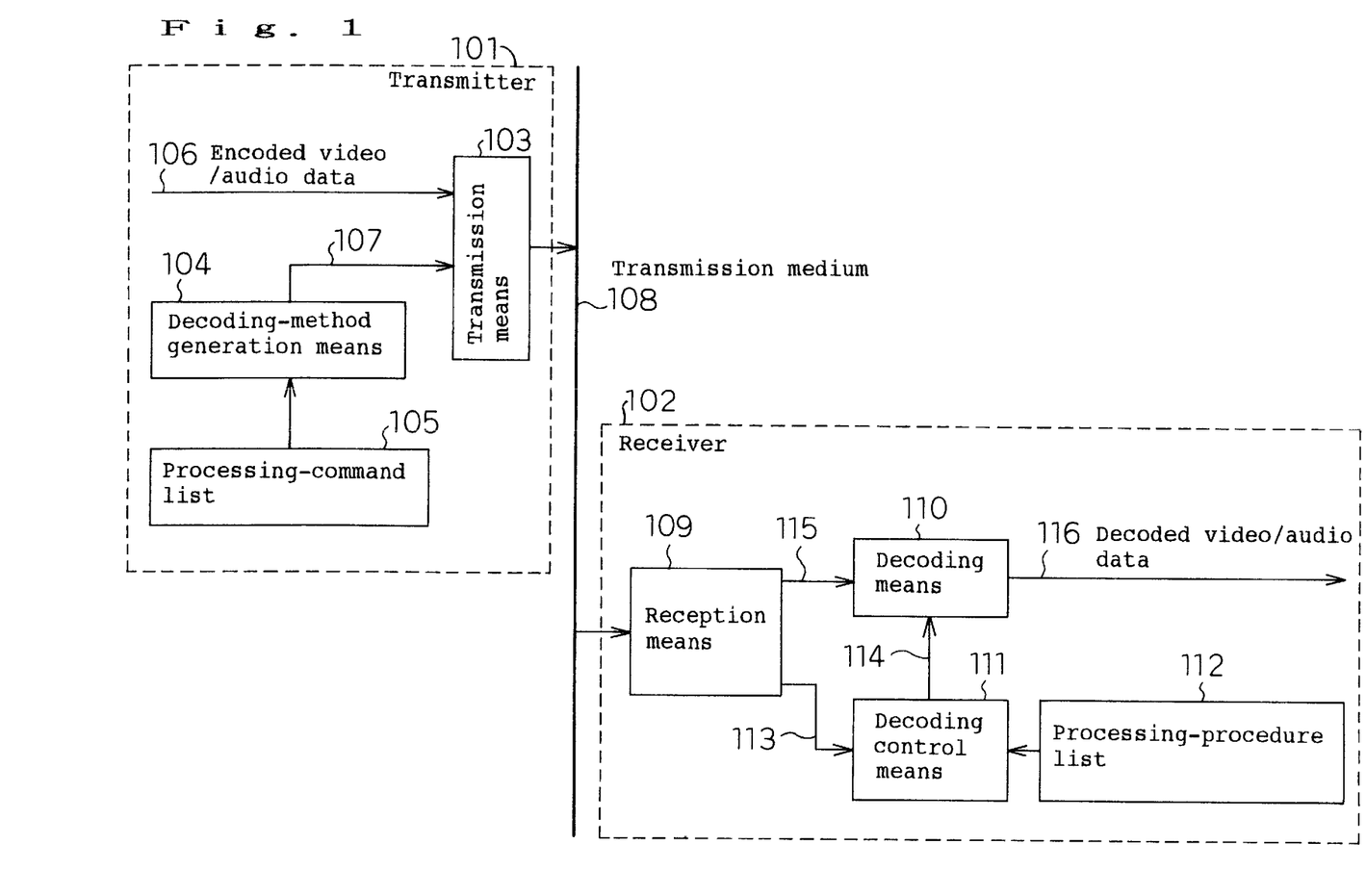
FIG. 1 is a block diagram showing main structures of the data transmitter and data receiver of the first embodiment of the present invention.

FIG. 1 is a block diagram showing schematic structures of the data transmitter and data receiver serving as the first embodiment of the present invention.

The structure of this embodiment is described by referring to FIG. 1.

That is, as shown in FIG. 1, a transmitter 101 for transmitting encoded digital video data and digital audio data is constituted with transmission means 103, decoding-method generation means 104, and a processing-command list 105.

Moreover, a receiver 102 for receiving and decoding encoded video data and audio data is constituted with reception means 109, decoding means 110, decoding control means 111, and processing-procedure list 112.

The processing-command list 105 has the contents shown Table 1.

TABLE 1

| Operator/function | Processing contents |
| --- | --- |
| Arithmetic operator (+, −, *, /, %) | Performs arithmetical operation. |
| Bit operator (&, \|, ^, >>, <<) | Performs bit operation. |
| Relational operator (<, >, ≧, ≦) | Performs magnitude comparison. |
| Equivalence operator (= =, !=) | Compares whether to be equal. |
| Logical operator (&&; \|\|) | Logical product and logical sum |
| Substitution operator (=) | Substitution |
| Monadic operator (−, + +, − −) | Sign change and increment/decrement |
| Reverse DCT operation function | Performs reverse DCT conversion. |
| Variable-length decoding function | Performs variable-length decoding. |
| Movement compensation function | Difference operation for each block in temporal direction |
| Screen output function | Screen output according to 4:2:0 or 4:1:1 |
| Color-space transform function | Transform of RGB space and brightness/color-difference space |

In the case of the above structure, operations of this embodiment are described below.

That is, when the transmitter 101 transmits the encoded video data and audio data 106, it transmits a decoding method before transmitting the data 106. The decoding method to be transmitted is any specific processing procedure included in the processing-command list 105 shown by a sequence, combination, or processing parameter.

That is, to express the decoding method to be transmitted, it is possible to use a program showing a general-purpose decoding algorithm instead of a decoding program according to the microcomputer, processor, or OS of each receiver. Though a plurality of methods for encoding video data and audio data have been used so far, most techniques used for encoding methods are common ones such as DCT, FFT (Fast Fourier Transform), and variable-length encoding and portions other than the above can be realized by normal arithmetic operations. Therefore, it is possible to specify a certain encoding or decoding procedure by regarding the techniques as routines and using the period between DCT blocks and the code table for variable-length encoding as parameters or flexibly express a decoding method by designating an arithmetic operation without depending on an OS or processor. Therefore, by expressing a decoding method in accordance with a method not depending on a specific system, the transmitter 101 can transmit the decoding method 107 independently of the system of the receiver 102. Moreover, it is unnecessary to prepare and transmit a plurality of specific decoding programs for and to each receiver. Furthermore, it is unnecessary to correspond to upgrading of the system of a receiver.

The processing-command list 105 corresponds to the processing-procedure list 112 of the receiver 102. Moreover, the processing-procedure list 112 is used to transform a decoding method received from the transmitter 101 into a suitable form for the receiver 102. This is described later.

Therefore, the decoding method 107 output by the decoding-method generation means 104 corresponds to a decoding program specifically used by the receiver 102.

Moreover, by using a program language for expressing the flexible general-purpose decoding algorithm, it is possible to avoid using a command for controlling the operation of a system. Therefore, it is possible to prevent an illegal program such as a computer virus from invading and improve the reliability of a system.

As described above, the decoding-method generation means 104 outputs the sequence or combination of the processing procedures included in the processing-command list 105 and the decoding method 107 shown by processing parameters. The decoding method 107 is transmitted before the encoded video data and audio data 106 is transmitted. Moreover, when encoding methods for the encoded video data and audio data 106 are changed while the data 106 is transmitted, a decoding method corresponding to the changed encoding method is transmitted before the data 106 encoded by the changed encoding method is transmitted.

That is, it is possible for the transmitter 101 to change and correct the encoding method under transmission in accordance with the property of picture and sound. Thus, by selecting an optimum encoding method suitable for the property of picture and sound, it is possible to transmit high-quality picture and sound and moreover, efficiently use a transmission medium.

The transmission means 103 transmits the encoded video data and sound data 106 to the transmission medium 108 and moreover, transmits the decoding method 107 to the transmission medium 108 when the decoding method 107 is input from the decoding-method generation means 104.

When receiving a decoding method, the reception means 109 of the receiver 102 for receiving and decoding encoded video data and audio data outputs the decoding method to the decoding control means 111. Moreover, the means 109 outputs the encoded video data and audio data to the decoding means 110.

When receiving the decoding method 113 from the reception means 109, the decoding control means 111 outputs a flexible decoding method shown by the decoding method 113 to the decoding means 110 as the decoding control signal 114 by using the processing-procedure list 112.

The processing-procedure list 112 stores various routines corresponding to the decoding method 113 in the form suitable for the apparatus. That is, each routine of processing procedures included in the processing-procedure list 112 is used for the OS and processor of the decoding means 110, which is replaced with the decoding method 113 received by the decoding control means 111 and output as the decoding control signal 114.

Because a decoding-algorithm expression method not depending on an OS or processor is used as the decoding method 113, the decoding control means 111 transforms the method into an exclusive program suitable for the decoding means 110 and outputs it as the decoding control signal 114. Thus, the decoding control means 111 transforms the received decoding method 113 into a program or processing parameter which can be used by the decoding means 110 and outputs it as the decoding control signal 114.

The decoding means 110 decodes the encoded video data and audio data 115 input from the reception means 109 in accordance with the decoding control signal 114 received from the decoding control means 111 and outputs the data 115 as the decoded audio data and audio data 116.

Moreover, this type of transmitter can not only transmit previously-encoded and accumulated video data and audio data but also encode the data simultaneously with transmission.

To express the decoding method used here, it is possible to use a general-purpose programming language such as the C-language or C++.

Generally, the procedure such as MPEG or DV for decoding encoded video data and audio data is roughly divided into the following three stages: (1) separating encoded video data from encoded audio data, (2) decoding encoded video data and audio data respectively, and (3) transforming decoded digital picture and sound into a form which can be output to a display and a loudspeaker. The above three stages are necessary.

The first portion for separation of encoded video data from encoded audio data can be realized by performing the arithmetic operation or bit operation, combining the substitution operation with the comparison operation or logic operation, or controlling a processing sequence by a control syntax such as a loop or branch when using a programming language.

Table 2 shows operators of the C-language that can be used here.

TABLE 2

| Operator | Type |
| --- | --- |
| +, −, *, /, % | Arithmetic operator |
| &, \|, ˆ, >>, << | Bit operator |
| <, >, ≧, ≦ | Relational operator |
| = =, != | Equivalence operator |
| &&, \|\| | Logical operator |
| = | Substitution operator |
| −, + +, − − | Monadic operator |

Secondly, encoded video data and audio data are decoded. To decode video data and audio data, variable-length encoding or run-length encoding is generally used. Particularly, in the case of video data, it is necessary to constitute a block corresponding to a pixel block by decoding a variable-length code before the transform such as reverse DCT. To decode a variable-length code, a code table used for encoding is necessary and it is possible to perform decoding through the bit operation or comparison operation by using the code table. Moreover, the data constituted as a block is reverse-discrete-cosine-transformed. The reverse DCT can be also realized by combining the arithmetic operation with a control syntax such as a loop. Similarly, it is possible to perform the transform such as FFT used for encoding a sound through the arithmetic operation. Furthermore, the difference operation (movement compensation) in the temporal direction used for MPEG or the like can be realized by combining arithmetic operations.

Figure 3:
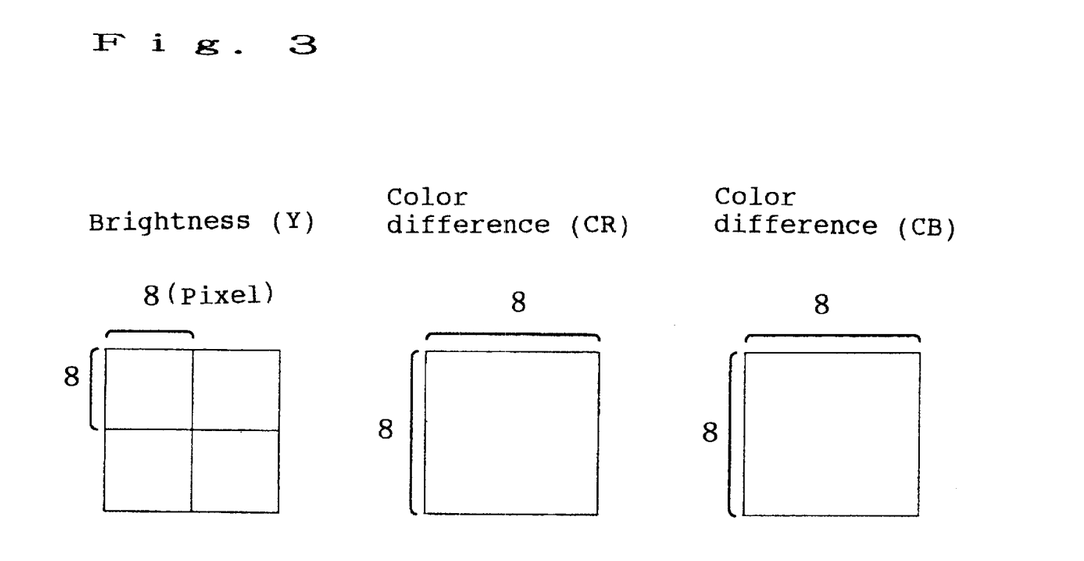
FIG. 3 is an illustration showing DCT blocks of the brightness and color difference of MPEG described for this embodiment.
Figure 4:
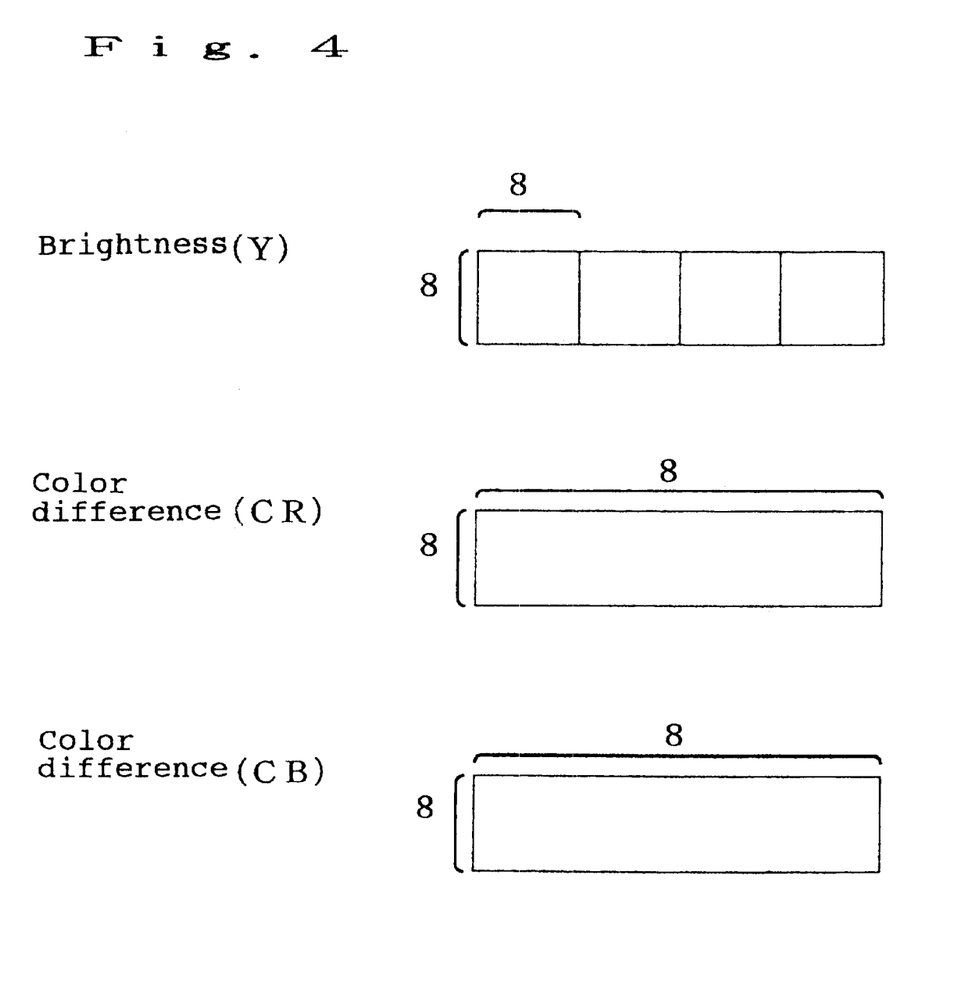
FIG. 4 is an illustration showing blocks of the brightness and color difference of DV described for this embodiment.

Thirdly, decoded video data and audio data are respectively transformed into a form that can be output. For example, in the case of a video signal, MPEG is different from DV in the transform method for transforming an original video signal into digital video data. The MPEG samples a brightness signal (Y) and color-difference signals (CR and CB) at a ratio of 4:2:0 but the DV samples a brightness signal and color-difference signals at a ratio of 4:1:1 in the case of an NTSC signal. Therefore, the DCT block of the MPEG has the form shown in FIG. 3 and that of the DV has the form shown in FIG. 4. That is, the MPEG is different from the DV in the method for outputting decoded data to a screen. However, the MPEG and DV can be transformed each other by combining substitution operations.

The processing for decoding and outputting the above encoded video data and audio data can be expressed by the operators included in Table 2 and control syntaxes such as repetition and branch for controlling the execution sequence of the operators. That is, the above operators are included in the processing-command list 105 of the transmitter 101 and the decoding-method control means 104 outputs a program expressed by these operators as a decoding method.

Moreover, C-language and C++ make it possible to define a series of procedures used for a plurality of decoding methods in common such as reverse DCT and variable-length decoding as one function. For example, when performing variable-length decoding, it is possible to concisely express the processing of variable-length decoding by previously defining a function having a received code series and a code table used for encoding as arguments. Also for the reverse DCT, by defining a series of procedures as one function, it is possible to realize the processing of variable-length decoding by calling a function using a block before transformed as an argument. Moreover, it is possible to define an output and a rearrangement function corresponding to the output format of 4:2:0 or 4:1:1. That is, it is possible to concisely express a decoding method by preparing variable-length decoding or reverse DCT as a common library used for C-language. Moreover, the common procedure such as reverse DCT can be executed by using an exclusive computing circuit and commands of a machine code language less than the number of combinations of arithmetic operations when using a signal-processing processor such as DSP as the decoding means 110. Therefore, by defining the above functions, it is possible to more efficiently use the functions of the decoding means 110 and thereby perform decoding. Table 1 shows the above processing-command list.

The decoding control means 111 of the receiver 102 receiving the decoding method (decoding program) thus generated must transform the decoding method into a form that can be used by the decoding means 110. This is equivalent to the fact that compiling is performed when a decoding method is expressed by C-language or C++. The decoding means 110 is generally constituted with a CPU and DSP and the decoding control means 111 compiles a received decoding program and outputs a machine code language command which can be used by the decoding means 110 as the decoding control method 113. When performing this transform, various operations and functions and matching with actual machine code language are included in the processing-procedure list 112. Particularly, concerning the call of a function, the entity of processing contents of a function expressed by a machine code language is included. The decoding control means 111 reads a necessary machine code language command from the processing-procedure list 112 and outputs it in accordance with a received decoding program.

Before transmitting the above decoding method, the transmitter 101 can transmit the processing environment information necessary for decoding video data and audio data. That is, it is possible to transmit the throughput of the decoding means 110 necessary for decoding video data and audio data under transmission as processing environment information. The processing environment information can be expressed by the computation quantity or processing data quantity per sec necessary to decode video data under transmission. Moreover, when a plurality of types of processing-procedure lists 112 are present in accordance with the number of procedures included in the lists 112, it is possible to transmit the type and version of a processing-procedure list necessary for decoding video data and audio data under transmission as processing environment information.

The receiver 102 receiving the processing environment information compares the throughput necessary for processing received video data and audio data with the throughput of the decoding means 110 or the type and version of a necessary processing-procedure list with the type of the processing-procedure list 112. When the receiver 102 decides that decoding cannot be performed, it can previously stop receiving and decoding data.

(Embodiment 2)

Figure 2:
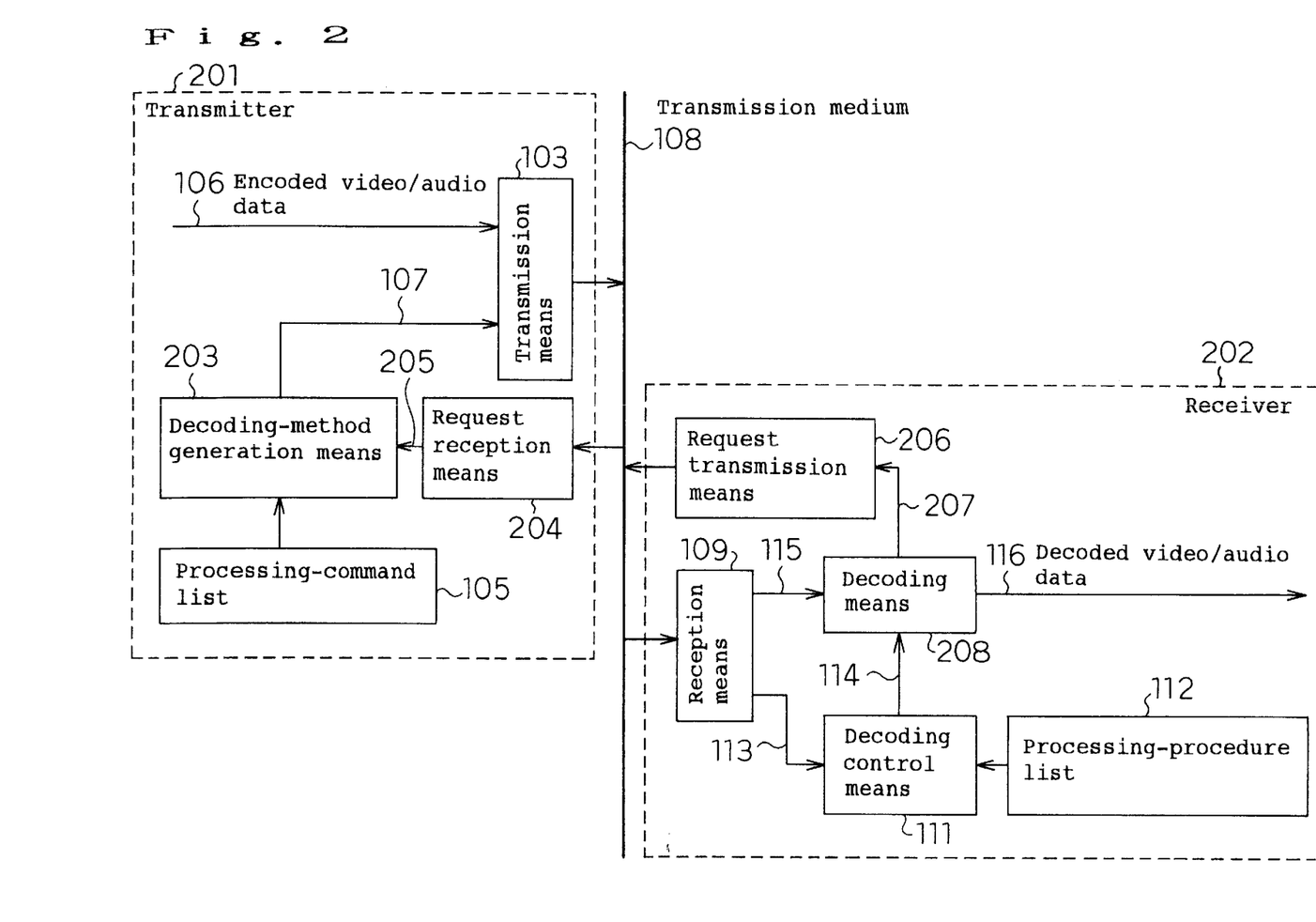
FIG. 2 is a block diagram showing main structures of the data transmitter and data receiver of the second embodiment of the present invention.

FIG. 2 is a block diagram showing schematic structures of the data transmitter and data receiver of the second embodiment of the present invention. The structure of this embodiment is described below by referring to FIG. 2. A portion same as that of the first embodiment is provided with the same symbol.

That is, as shown in FIG. 2, a transmitter 201 for transmitting encoded digital video data and digital audio data is constituted with transmission means 103, decoding-method generation means 203, processing-command list 105, and request reception means 204. A receiver 202 for receiving and decoding encoded video data and audio data is constituted with reception means 109, decoding means 208, decoding control means 111, processing-procedure list 112, and request transmission means 206.

In the case of the above structure, operations of this embodiment are described below.

That is, when receiving a decoding-method transmission request from a transmission medium 108, the request reception means 204 of the transmitter 201 decides a predetermined condition and, when the request meets the condition, outputs a decoding-method transmission command 205 to the decoding-method generation means 203. Moreover, when receiving the decoding-method transmission command, the decoding-method generation means 203 combines processing procedures included in the processing-command list 105 and generates a decoding method in accordance with processing parameters and outputs the method as a decoding method 107 similarly to the case of the first embodiment.

The decoding means 208 of the receiver 202 decodes the video data and audio data 115 encoded by a decoding control signal 114 received from the decoding control means 111 as described for the first embodiment.

Moreover, when detecting that encoded video data and audio data 115 cannot be normally decoded through the decoding based on the designation of a decoding control signal 114 received from the decoding control means 111, the decoding means 208 outputs a decoding-method transmission request 207.

This also occurs when methods for encoding video data and audio data are changed. Moreover, the same is true for the case in which the encoded video data and audio data 115 are input from the reception means 109 before receiving the decoding control signal 114 from the decoding control means 111. If a trouble is detected under decoding performed by the decoding means 208, the decoding-method transmission request 207 is output.

The same advantage as scrambling video data and audio data can be obtained by changing decoding parameters such as the fact that the decoding-method generation means 203 intentionally uses a variable-length-encoding code table different from the normal one. That is, it is possible to conceal video data and audio data.

Thus, when the decoding means 208 of the receiver 202 detects that encoded video data and audio data cannot be normally decoded by parameters different from normal ones, the means 208 outputs the above decoding-method transmission request 207. The request reception means 204 of the transmitter 201 receiving the above decoding-method transmission request can decide whether to transmit a decoding method to the receiver 202 outputting the request. That is, a picture and sound can be communicated with only a specific receiver and moreover, a system used for broadcasting or the like can perform accounting or the like. In the case of cable television and the like, accounting may be performed for each broadcast program or channel. A transmitter can realize the concealment to those other than purposed normal receivers and perform accounting control by changing encoding methods for each broadcast program or channel.

In the case of the above receiver, it is also possible to use the identification information for identifying a method for encoding video data and audio data together, prepare a decoding method to be frequently used, and inquire a decoding method only when an encoding method other than the above encoding method is used as described for the conventional system.

The case in which IEEE 1394 is transmitted is described below.

Figure 5:
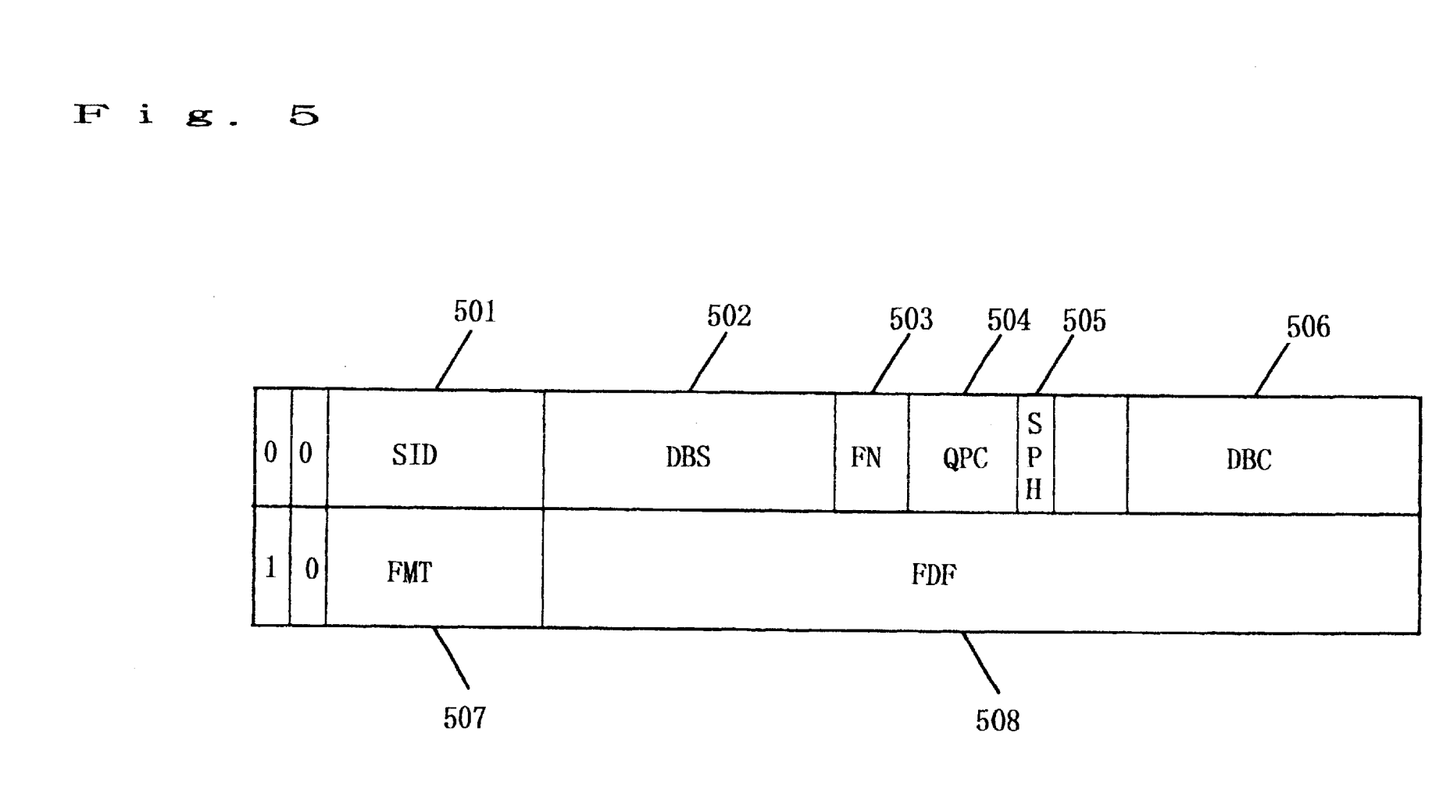
FIG. 5 is an illustration showing the header information of the second embodiment of the present invention.

To transmit video data and audio data by using IEEE 1394, the header information shown in FIG. 5 is added to the head portion of the video data and audio data. FMT (Format) 507 included in the header is the identification information showing the type of data. The FMT of 000000 shows that the data currently transmitted is the data for DV. Moreover, the FMT of 100000 shows the data for the transport stream of MPEG. As shown in FIG. 5, the header information is constituted with not only the FMT 507 but also SID (Source node ID) 501, DBS (Data Block Size) 502, FN (Fraction Number) 503, QPS (Quadlet Padding Count) 504, SPH (Source Packet Header) 505, DBC (Data Block continuity Counter) 506, and FDF (Format Dependent Field) 508.

Moreover, even when using other communication information, the same identification information is generally added and transmitted.

When data shows normal MPEG data at a portion for showing the type of data like the FMT, a receiver decodes data in accordance with the decoding method of MPEG previously owned by the receiver. However, when the FMT shows an unknown type, the receiver inquires a decoding method.

Thereby, it is possible to minimize the number of decoding methods to be transmitted and prevent unnecessary decoding methods from being transmitted.

Moreover, only when the above concealment is purposed, a receiver encodes data but its decoding method is unknown and transmits the data. When the reception side requests transmission of a decoding method because the data cannot be decoded at the reception side, whether it is possible to transmit the decoding method to the receiver is decided. Only when it is possible, the decoding method is transmitted. Thereby, it is possible to use the present invention for concealment of information.

That is, when performing broadcasting by using MPEG, a broadcast program which does not limit receivers like free-of-charge broadcasting is transmitted together with the identification information showing MPEG. Moreover, the usage is realized that an encoding method not known by a receiver is used for a broadcast-program limiting receivers or required for accounting.

As described above, in the case of the present invention, by transmitting a method for decoding encoded video data and audio data together with video data and audio data, it is possible to use a new encoding method which is not previously prepared and transmit encoded video data and audio data without limiting decoding methods owned by a receiver for receiving and decoding encoded video data and audio data. Moreover, by using a general-purpose expression method not depending on an OS or processor as the encoding method, a transmitter can transmit a decoding method without depending on the OS or processor of a receiver or the version of a system. Furthermore, because encoding methods can be changed or corrected while encoded video data and audio data are transmitted, it is possible to realize an optimum encoding method suitable for the properties of video data and audio data. Thereby, it is possible to transmit high-quality picture and sound and moreover, it is possible to effectively use a transmission medium.

Furthermore, by making a predetermined conditional decision when transmitting a decoding method in accordance with a request from a receiver, a transmitter can select a receiver and application to an accounting system is realized.

Also for an apparatus for receiving encoded video data and audio data and a decoding method, it is possible to reduce the hazard of receiving an illegal program such as a computer virus compared to the case of receiving a program by using a general-purpose expression method as the decoding method.

Also in the case of this embodiment, it is possible to transmit the processing environment information necessary for decoding video data and audio data before transmitting a decoding method similarly to the case of the first embodiment.

(Embodiment 3)

Figure 6:
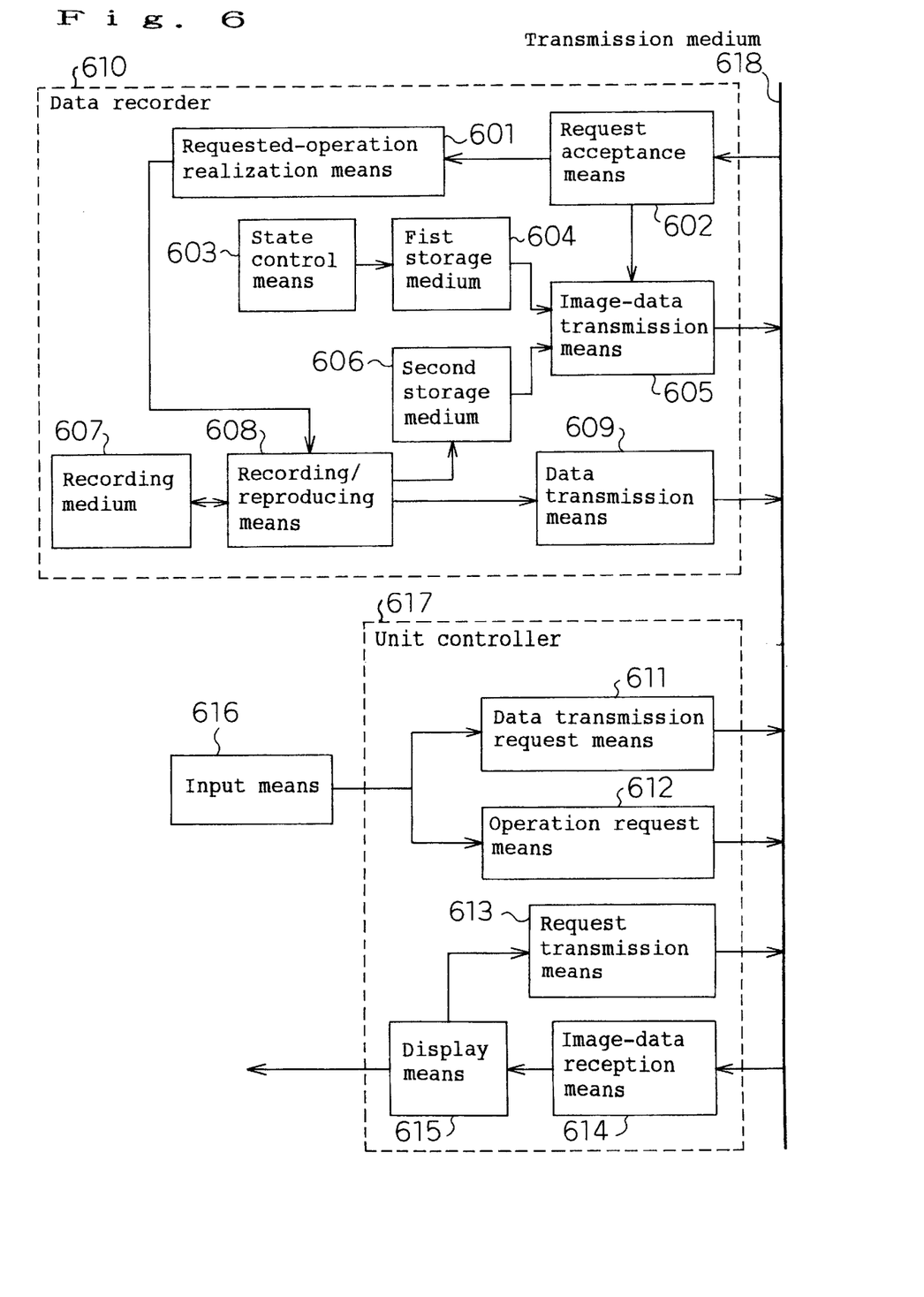
FIG. 6 is a block diagram showing main structures of the data recorder and unit controller of the third embodiment of the present invention.

FIG. 6 is a block diagram showing a schematic structure of the data recorder and unit controller of the third embodiment according to the present invention.

A recorder 610 for recording encoded video data and encoded audio data is constituted with a requested-operation realization means 601, request acceptance means 602, state control means 603, first storage medium 604, image-data transmission means 605, second storage medium 606, recording medium 607, recording/reproducing means 608, and data transmission means 609 and connected to a transmission medium (communication medium) 618. The data recorder 610 corresponds to a digital VCR having a tape and a disk as the recording medium 607. The data recorder 610 corresponds to a processor and a data transmitter of the present invention. Moreover, the request acceptance means 602 includes first and second request-acceptance means of the present invention.

A unit controller 617 is constituted with data-transmission request means 611, operation request means 612, request transmission means 613, image-data reception means 614, and display means 615 and connected to a transmission medium 618 and input means 616 for receiving a designation from a user. The unit controller 617 corresponds to, for example, an apparatus such as a PC. In the case of the PC, a display for displaying objects and means for inputting a designation from a user are connected such as a keyboard and mouse. The structure of this embodiment corresponds to a unit control system and a data transmission/reception system of the present invention.

In the case of the above structure, operations of this embodiment are described below.

That is, to display the information for an apparatus connected to the transmission medium 618 on a screen, the display means 615 of the unit controller 617 outputs a request for image data to the request transmission means 613. The image data is the data for visually showing the apparatus and is used to display the apparatus on a screen.

Then, the request transmission means 613 receiving the image-data request transmits the image-data request to the data recorder 610.

Moreover, the request acceptance means 602 of the data recorder 610 receiving the image-data request for the apparatus outputs the request to the image-data transmission means 605. When receiving the transmission request for the image data for the apparatus, the image-data transmission means 605 reads the image data showing functions of the apparatus such as a tape and a disk from the first storage medium 604 and transmits the data to the transmission medium 618.

The image-data reception means 614 of the unit controller 617 receives the image data for the apparatus from the transmission medium 618 and outputs the received image data to the display means 615. The display means 615 displays the image data for the apparatus 610 on a screen. When the transmission medium 618 connects with an apparatus other than the data recorder 610, the display means 615 repeats the above operations and displays all units connected to the transmission medium 618 on a screen.

In this case, the image data for each apparatus is the data for visually showing a function or operation of the apparatus such as a tape or disk and is used as an icon on the screen of a PC. Thereby, a user can perform the operation for the data recorder 610 by inputting the operation about an icon displayed on the screen of the PC. Thus, when an operation command for the data recorder 610 is input through the input means 616 by using an icon displayed on a screen, the operation request means 612 of the unit controller 617 transmits the operation request to the data recorder 610. The operation request in the above case corresponds to playback, recording, quick traverse, or rewiring when the data recorder 610 is a VCR.

The request acceptance means 602 of the data recorder 610 receives the above operation request when receiving the request from the unit controller 617 and outputs the request to the requested-operation realization means 601. The requested-operation realization means 601 judges the content of the operation request and outputs a judgment result to the recording/reproducing means 608 as a designation. Thereby, the operation requested by the unit controller 617 is realized.

Moreover, the state control means 603 of the data recorder 610 can monitor state of the data recorder 610 and switch the image data showing a state of an apparatus stored in a first storage medium out of a plurality of image-data values in accordance with the state of the monitor. In this case, the image-data values are changed for example, while a VCR stops or reproduces data or when a tape is not set to the VCR. By displaying the above image data, it is possible to easily and clearly show the state of the data recorder 610 to a user. Moreover, in the above case, the unit controller 617 can display a state of the data recorder 610 on a screen by regularly reading and displaying the above icon.

Then, a case is described below in which the unit controller 617 displays the image data showing the content of the data recorded in the data recorder 610.

When the unit controller 617 displays the image data showing the content of the data recorded in the data recorder 610, the display means 615 of the unit controller 617 outputs a request for the image data for visually showing the content of the data. Then, the request transmission means 613 receiving the request transmits the request for the image data to the data recorder 610.

Moreover, the request acceptance means 602 of the data recorder 610 receiving the request for the image data for the content of the data outputs the request to the image-data transmission means 605. The image-data transmission means 605 receives the request for transmitting the image data for the content of the data, reads the image data for visually showing the content of the data from the second storage medium 606, and transmits the image data to the transmission medium 618.

The image-data reception means 614 of the unit controller 617 receives the image data for the content of the data from the transmission medium 618 and outputs the received image data to the display means 615. The display means 615 displays the image data for the content of the data on a screen similarly to the case of the above-described image data for an apparatus.

In this case, when a plurality of data values are recorded in the recording medium 607 of the data recorder 610, the recording/reproducing means 608 can read a necessary portion of the data values and write a plurality of image-data values in the second recording medium 606. Moreover, when video data is included in the data recorded in the recording medium 607, it is possible to generate the image data showing the content of the data in accordance with static pictures included in the video data. Moreover, it is possible to generate one image-data value in accordance with a plurality of static pictures.

Thus, when a plurality of image-data values are stored in the second storage medium 606 of the data recorder 610, the display means 615 of the unit controller 617 reads all these image-data values in accordance with the above-described method and displays them on a screen.

Moreover, when the above image data is displayed on the screen of a PC as an icon, a user can perform the operation for reading data from the data recorder 610 by inputting the operation for the icon. Thus, when the input for selecting an icon for the content of data is made through the input means 616, the data transmission request means 611 transmits the request for transmitting the selected data to the data recorder 610.

The request acceptance means of the data recorder 610 receives the request and outputs it to the requested-operation realization means 601. The requested-operation realization means 601 judges the content of the request and instructs the recording/reproducing means 608 to execute the reproducing operation and output reproduced data. Moreover, the data transmission means 609 transmits the reproduced data to the transmission medium 618. Thus, the reproduced and transmitted data is received by the unit controller 617 and other apparatuses and thereby, the data can be decoded or copied.

As described above, in the case of the present invention, each apparatus has the image data for visually showing the type of apparatus and the image data for visually showing the content of data, which are required by a unit controller and thereby, the unit controller can display image data on a screen or the like independently of the type of each apparatus or the format or content of data and designate an operation or output according to necessity. Thereby, the unit controller does not need to correspond to many types of apparatuses or many types of data while the controller can easily correspond to a new type of apparatus or data.

Moreover, by switching a plurality of image-data values in accordance with a state of an apparatus, it is possible to easily visually show the state of the apparatus. Furthermore, in the case of the image data for the content of data, when a data recorder records a plurality of data values, a unit controller does not need to perform operations for reading all data and generating image data while the controller can easily display the image data for the contents of a plurality of data values independently of the type of data because the data recorder uses a plurality of image-data values respectively corresponding to each data value recorded in the data recorder.

Furthermore, it is possible to use the structure described for the third embodiment simultaneously with the structure described for the first or second embodiment. Therefore, a unit controller and a data receiver provided with the structures of the both embodiments can select a specific apparatus or data independently of the type of unit or the type of data and moreover, can read data from the apparatus, properly decode the data, and display the data. Therefore, the unit controller and data receiver do not need to previously prepare a plurality of types of apparatuses, a plurality of types of data, or a plurality of decoding methods while they can correspond to a new object without updating or adding the information for these types.

The operations and processings shown in the above first, second, and third embodiments can be also performed by a CPU and software for the CPU in order to realize each means.

Moreover, it is possible to prepare a magnetic recording medium or optical recording medium storing a program for making a computer execute the functions of all or some of means described in any one of the above embodiments and make the computer execute the above operations by using the medium. Also in this case, the effect same as the above is obtained.

For the above embodiment 3, a case is described in which the image data for visually showing a function of a data recorder and state of the data recorder, the image data for visually showing the contents of video data and audio data, and transmission of the request for transmitting these two types of image data are handled. However, it is also possible to use a structure for handling either of the two types of image data and transmission of the request for transmitting the image data.

Moreover, for the above embodiment 3, a case is described in which the execution of an operation request for requesting an operation of an apparatus and the operation corresponding to the transmission request and the transmission of a transmission request for video data and audio data and the data corresponding to the transmission request are performed. However, it is also possible to use a structure for performing either of the above execution and transmission or a structure for only performing the transmission of the above image data and its transmission request but not performing the above execution or transmission.

Moreover, in the case of the embodiment 3, image data of the present invention is the image data for visually showing a function of an apparatus and a state of the apparatus. However, it is also possible to use image data for visually showing a function of an apparatus or a state of the apparatus.

Furthermore, in the case of the embodiment 3, image data of the present invention is the image data for visually showing the contents of video data and audio data. However, it is also possible to use the image data for visually showing the content or video data or audio data.

INDUSTRIAL APPLICABILITY

As described above, the present invention makes it possible to provide a data transmitter and a data receiver capable of corresponding to a plurality of encoding methods and a new encoding method by transmitting a decoding method together with data when transmitting encoded video data and audio data. Moreover, the present invention makes it possible to provide a data transmitter, processor, unit controller, unit control system, data transmission/reception system, and medium capable of displaying a plurality of types of units and a plurality of types of data and moreover, an icon related to the content of data by the fact that each unit connected by a communication medium has the image data such as an icon used to visually display a unit or data instead of the fact that a unit for displaying an object on a screen has the image data.

What is claimed is:

1. A data transmitter comprising:
    transmission means of transmitting at least either of encoded video data and encoded audio data to a data receiver;
    a processing-command list for holding a processing procedure common to said data receiver; and
    decoding-method generation means of expressing a method for decoding at least either of said encoded video data and encoded audio data by the sequence of said processing procedure included in said processing-command list and processing parameters, and outputting the method as a decoding method, wherein
    said transmission means transmits at least either of said encoded video data and encoded audio data, and additionally transmits said decoding method.

2. The data transmitter according to claim 1, wherein said decoding method is transmitted before at least either of said encoded video data and encoded audio data is transmitted.

3. The data transmitter according to claim 1, wherein, when corresponding decoding methods are changed while at least either of said encoded video data and encoded audio data is transmitted, said decoding-method generation means outputs the changed decoding method.

4. The data transmitter according to claim 1, wherein
said transmission means transmits said decoding method before transmitting at least either of said encoded video data and encoded audio data, and
when methods for encoding said encoded video data and audio data are changed while at least either of said encoded video data and encoded audio data is transmitted, said decoding-method generation means outputs a decoding method corresponding to the changed encoding method.

5. A data transmitter comprising:
transmission means for transmitting at least either of encoded video data and encoded audio data to a data receiver;
request reception means for receiving an inquiry about the method for decoding at least either of said encoded video data and encoded audio data, making a predetermined decision, and thereafter outputting a decoding-method transmission command in accordance with the decision result;
a processing-command list for holding a processing procedure common to said data receiver; and
decoding-method generation means for expressing a method for decoding at least either of said encoded video data and encoded audio data by the sequence of said processing procedure and processing parameters included in said processing-command list when obtaining the output of said decoding-method transmission command and outputting the method as a decoding method; wherein
said transmission means transmits at least either of said encoded video data and encoded audio data and moreover, transmits said decoding method.

6. The data transmitter according to claim 1, wherein processing environment information is transmitted as the criterion for said data receiver to decide whether said decoding method can be executed by said data receiver before said decoding method is transmitted.

7. A data receiver comprising:
reception means for receiving at least either of encoded video data and encoded audio data and a decoding method from a data transmitter;
a processing-procedure list for holding a processing procedure common to said data transmitter and a method for realizing said processing procedure;
decoding control means for obtaining said received decoding method, reading a method for realizing a processing procedure included in the decoding method from said processing-procedure list and outputs the method as a decoding control signal; and
decoding means for decoding at least either of said received video data and audio data in accordance with the designation by said decoding control signal.

8. A data receiver comprising:
reception means for receiving at least either of encoded video data and encoded audio data and a decoding method from a data transmitter;
a processing-procedure list for holding a processing procedure common to said data transmitter and said processing-procedure realizing method;
decoding control means for obtaining said received decoding method, reading a processing-procedure real-izing method included in the decoding method from said processing-procedure list, and outputting the method as a decoding control signal;
decoding means for decoding at least either of said received video data and audio data in accordance with the designation by said decoding control signal, decides whether the decoding is normal, and outputting a decoding-method transmission request for requesting the decoding method when obtaining a decision result that said decoding is not normal; and
request transmission means for transmitting an inquiry about said decoding method when receiving said decoding-method transmission request.

9. The data receiver according to claim 8, wherein said data transmitter includes:
transmission means for transmitting at least either of encoded video data and encoded audio data to the data receiver;
request reception means for receiving an inquiry about the method for decoding at least either of said encoded video data and encoded audio data, making a predetermined decision, and thereafter outputting a decoding-method transmission command in accordance with the decision result;
a processing-command list for holding a processing procedure common to said data receiver; and
decoding-method generation means for expressing a method for decoding at least either of said encoded video data and encoded audio data by the sequence of said processing procedure and processing parameters included in said processing-command list and outputting the method as a decoding method; wherein
said transmission means transmits at least either of said encoded video data and encoded audio data, and additionally transmits said decoding method.

10. The data receiver according to claim 9, wherein said decoding means outputs said decoding-method transmission request when at least either of said received video data and audio data is input before said decoding control signal is input.

11. The data receiver according to claim 8, wherein said decoding means outputs said decoding-method transmission request when decoding based on the designation by a decoding control signal cannot be substantially performed because methods for encoding at least either of said received video data and audio data are changed.

12. The data receiver according to claim 8, wherein said decoding means outputs a decoding-method transmission request when at least either of said received video data and audio data is input before a decoding control signal is input and moreover, outputs said decoding-method transmission request when decoding based on the designation by said decoding-control signal cannot be substantially performed because methods for encoding at least either of said received video data and audio data are changed.

13. The data receiver according to claim 7, wherein said data receiver stops the reception of said data when receiving the processing environment information serving as a criterion for deciding whether said decoding method can be executed before executing said decoding-method transmission request or said decoding method, and deciding that said decoding method cannot be executed.

14. A processor apparatus comprising:
a storage medium for holding image data for visually showing to an external device a function of said processor apparatus and a state of said processor apparatus, wherein either of the function and the state of said processor apparatus is transmitted to the external device to visually identify either the type of operation of the processor apparatus or the current operation status of the processor apparatus;

first request-acceptance means for accepting a transmission request from the external device for requesting the transmission of said image data; and image-data transmission means for reading said image data from said storage medium and transmitting the image data when said first request-acceptance means receives said transmission request;

wherein second request-acceptance means for accepting an operation request for requesting the operation of said processor and requested-operation realization means for realizing a corresponding operation when said second request-acceptance means receives said operation request are included.

15. A data transmitter comprising:

a storage medium for holding (1) image data for visually showing to an external device a function of the data transmitter and a state of said data transmitter and (2) image data for visually showing content of at least either of video data and audio data, said image data for visually showing content represented by a series of static pictures or icons;

wherein either of the function and the state of said data transmitter is transmitted to the external device to visually identify either the type of operation of the data transmitter or the current operation status of the data transmitter;

first request-acceptance means for accepting a transmission request from the external device for requesting the transmission of said image data;

image-data transmission means for reading said image data from said storage medium and transmitting the image data when said first request-acceptance means receives said transmission request, and second request-acceptance means for accepting a transmission request for requesting transmission request for requesting transmission of at least either of said video data and audio data and data transmission means for transmitting said video data and/or said audio data corresponding to said transmission request received by said second request-acceptance means.

16. The data transmitter according to claim 15, wherein said image data is constituted with a part of said video data.

17. The data transmitter according to claim 15, wherein a recording medium in which said video data and/or audio data is recorded is included and said storage medium holds a plurality of said image-data values corresponding to said recorded data.

18. A data receiver comprising:

reception means for receiving at least either of encoded video data and encoded audio data and a decoding method from a data transmitter;

a processing-procedure list for holding a processing procedure common to said data transmitter but not depending on the type of a reception side and a method for realizing said processing procedure;

decoding control means for obtaining said received decoding method, reading a method for realizing a processing procedure included in said decoding method from said processing-procedure list, and outputting the method as a decoding control signal; and decoding means for decoding at least either of said received video data and audio data in accordance with the designation by said decoding control signal.

19. A data transmitting and receiving system comprising:

a data transmitter including:

transmission means for transmitting at least either of encoded video data and encoded audio data to a data receiver;

a processing-command list for holding a processing procedure common to said data receiver; and decoding-method generation means for expressing a method for decoding at least either of said encoded video data and encoded audio data by the sequence of said processing procedure and processing parameters included in said processing-command list and outputting the method as a decoding method, wherein said transmission means transmits at least either of said encoded video data and encoded audio data and moreover, transmits said decoding method and said data receive including:

reception means for receiving at least either of encoded video data and encoded audio data and a decoding method from said data transmitter;

a processing-procedure list for holding a processing procedure common to said data transmitter and a method for realizing said processing procedure;

decoding control means for obtaining said received decoding method, reading a method for realizing a processing procedure included in the decoding method from said processing-procedure list and outputs the method as a decoding control signal; and decoding means for decoding at least either of said received video data and audio data in accordance with the designation by said decoding control signal.

20. A method of communicating at least one of video data and audio data, comprising the steps of:

(a) storing a plurality of processing procedures in the transmitter;

(b) selecting at least one processing procedure from the stored processing procedures;

(c) encoding at least one of the video data and audio data using the selected processing procedure;

(d) transmitting in sequence an identification of the selected processing procedure, and the at least one of the encoded video data and audio data;

(e) receiving in sequence the identification of the selected processing procedure, and the at least one of encoded video data and audio data;

(f) selecting a processing procedure in the receiver in response to the received identification; and (g) decoding the received at least one of the video data and audio data using the selected processing procedure.

21. The method of claim 20 wherein the processing procedure in the transmitter is a general purpose algorithm including one of a discrete cosine transform, a fast Fourier transform and a variable length encoder.

* * * * *